United States Patent [19]

Ismail et al.

[11] Patent Number: 4,733,541
[45] Date of Patent: Mar. 29, 1988

[54] CONSTANT COOLING CIRCUIT AND SYSTEM

[75] Inventors: Raouf A. Ismail, Concord; Suresh Madhavan, Framingham, both of Mass.

[73] Assignee: Cambridge Aeroflo Inc., Shirley, Mass.

[21] Appl. No.: 905,169

[22] Filed: Sep. 9, 1986

[51] Int. Cl.$^4$ ............................ F24F 7/00; H02B 1/00
[52] U.S. Cl. ........................................ 62/186; 236/49; 361/384
[58] Field of Search ................. 62/186, 130; 236/49, 236/13, 94, 68 B, 68 C; 374/39, 40, 41; 323/366; 361/382, 383, 384, 385

[56] References Cited

U.S. PATENT DOCUMENTS

| | | | |
|---|---|---|---|
| 3,125,109 | 3/1964 | Kreuter | 236/13 X |
| 4,174,065 | 11/1979 | Knauth | 236/49 |
| 4,257,552 | 3/1981 | Farkas et al. | 236/49 X |
| 4,476,720 | 10/1984 | Ismail et al. | 73/202 |

FOREIGN PATENT DOCUMENTS

| | | | |
|---|---|---|---|
| 0041719 | 3/1982 | Japan | 62/130 |
| 0153139 | 9/1982 | Japan | 62/130 |

*Primary Examiner*—Harry B. Tanner
*Attorney, Agent, or Firm*—Joseph S. Iandiorio; Douglas E. Denninger

[57] ABSTRACT

A circuit for monitoring the heat dissipation capacity of a cooling medium by defining the initial heat dissipation capacity of the medium at a predetermined temperature of a temperature-sensitive element immersed in the medium. The circuit senses a change in temperature of the element and restores the temperature of the element to the predetermined temperature. Based on the level of power required to restore the temperature of the element to the predetermined temperature, the circuit defines the adjustment in heat dissipation capacity of the medium required to return the medium to the initial capacity. Also disclosed is a system including such a circuit which modifies the heat dissipation capacity of the medium by the required adjustment to return the medium to the initial heat dissipation capacity.

18 Claims, 4 Drawing Figures

CONSTANT COOLING CIRCUIT AND SYSTEM

FIELD OF INVENTION

This invention relates to a circuit which imparts a measured quantity of power to a temperature-sensitive element to monitor the heat dissipation capacity of a cooling medium and to a system including such a circuit which maintains a cooling medium at a constant level of heat dissipation.

BACKGROUND OF INVENTION

Dissipation of heat generated by equipment depends on many factors, several of which are not compensated for by present cooling systems. The heat dissipation capacity of a fluid depends on the ambient temperature of the fluid, its rate of flow past the object to be cooled, its density, and the specific heat of the fluid. Decreasing the density or flow or increasing the temperature significantly reduces the cooling effectiveness of the medium.

It is desirable to maintain a constant level of cooling, that is, to remove the same amount of heat as the object to be cooled produces at a constant operating temperature. However, most present systems simply cool equipment at a single, constant rate of flow or rate of heat extraction, that is, refrigeration: if the heat dissipation capacity of the cooling fluid decreases, the equipment eventually overheats and its components may become damaged even if the equipment continually generates the same amount of heat. Heat dissipation capacity of a fluid is decreased, for example, when its temperature increases or its density decreases without a corresponding increase in flow. Further, an increase in operating temperature may exceed the fixed flow or refrigeration level.

There a number of applications in which it is preferable to cool buildings and equipment accurately, that is, to cool them efficiently using only as much forced air movement or refrigeration as actually required. Fluid-flow systems, e.g., systems utilizing forced air moved by fans, must have sufficient capacity to adequately cool the equipment yet are frequently quite noisy especially at maximum cooling rates. Use of sophisticated office equipment which require cooling is increasing dramatically, but the attendant noise in the office environment must be maintained within acceptable bounds. In addition to producing objectionable noise at maximum cooling rates, equipment is increasingly used in a variety of operating environments which range from sea-level to high altitudes, and from temperate climates to desert temperatures. An increase in altitude decreases the density of the cooling air and decreases its heat dissipation capacity, as does an increase in temperature of the air.

One system for measuring the cooling effectiveness of a fluid utilizes two thermometers, one positioned to measure the ambient temperature and the other positioned at the exit of the cooling medium from the machine. A rise in the exit temperature indicates that the cooling effectiveness of the medium is insufficient. However, the difference in exit temperature between best case cooling and worst case cooling may be quite small, e.g., only 5°-6° C. Consequently, accurate control of the fluid mover, e.g., a fan, is difficult at present.

Moreover, when there is a loss of cooling air in equipment such as a computer, the entire flow field, that is, the flow pattern of the air, often changes dramatically. The flow pattern may even become reversed. When this occurs, the temperature at the sensing point may bear no relationship to the actual temperature of one or more portions of a computer. Once this relationship is lost, the monitoring system is no longer reliable and serious overheating of components often results.

There are several systems which measure the resistance of a sensor rather than directly measure temperature with a thermometer. Any material exhibits a change in electrical resistance when its temperature increases; typically, resistance increases with increasing temperature. As described in U.S. Pat. No. 4,476,720 by Ismail et al., some systems monitor a thermistor in an air flow whose resistance lowers when temperature rises. Reduction in resistance to a preselected value is simply detected as an alarm condition. The systems do not modify the heat dissipation capacity of the air flow, e.g., by selectively varying the flow of the air or its temperature.

In hot-wire anemometry, change in resistance of a wire is used to measure velocity. Current is passed through a wire and control circuitry maintains the wire at a constant temperature; alternatively, the circuitry applies a constant level of current to the wire. The amount of cooling experienced by the wire is used to calculate the velocity of the fluid in which it is placed. Temperature compensating circuits eliminate the effect of ambient temperature so that the hot-wire device functions solely as a velocity sensor.

SUMMARY OF INVENTION

It is therefore an object of this invention to provide a circuit and system which maintain a constant level of heat dissipation by a cooling medium such as a fluid.

It is a further object of this invention to provide such a circuit and system which monitor the complete heat dissipation capacity of the fluid.

It is a further object of this invention to provide such a circuit and system which utilize an element that simulates the ability of the equipment to dissipate heat.

A still further object of this invention is to provide a system which can variably and accurately alter the flow and/or temperature of the fluid.

Yet another object of this invention is to provide a system which operates a cooling mechanism quietly and efficiently, and responds more rapidly than conventional cooling systems.

It is a further object of this invention to provide such a system which is more reliable than conventional cooling systems and is relatively inexpensive.

The invention results from the realization that truly effective control of convective cooling by a fluid can be achieved by a system which controls a temperature-sensitive element at a predetermined temperature in a cooling medium and quantifies heat dissipation from the element to determine adjustments in heat dissipation capacity of the medium required to maintain the capacity of the medium at a constant level.

This invention features a circuit for monitoring the heat dissipation capacity of a cooling medium. There are means for defining the initial heat dissipation capacity of the medium at a predetermined temperature of a temperature-sensitive element immersed in the medium, and temperature correction means for sensing a change in temperature of the element and for restoring the temperature of the element to the predetermined temperature. The circuit further includes adjustment determination means, responsive to the temperature correction means, for defining the adjustment in heat dissipation capacity of the medium required to return the medium to the initial capacity.

In one embodiment, the means for defining imparts a first level of power to the temperature-sensitive element to maintain it at the predetermined temperature. The temperature correction means may alter the level of power imparted to the element until the predetermined temperature is achieved at a second level of energy. The adjustment determination means establishes the required adjustment in heat dissipation capacity as a function of the difference between the first and second levels of energy.

In another embodiment, the means for defining includes a bridge circuit having the temperature-sensitive element in one leg of the bridge circuit. The bridge circuit is balanced by the resistance of the element at the predetermined temperature and the temperature correction means includes means, responsive to a bridge imbalance, for varying current flow to the bridge circuit to return the temperature-sensitive element to the predetermined temperature and rebalance the bridge a different voltage level. The adjustment determination means represents the required adjustment in heat dissipation capacity as the difference in voltage between the first and second bridge balance levels. The temperature-sensitive element may be a thermistor.

This invention also features a monitoring circuit including a bridge circuit, one leg of which includes a temperature-sensitive resistance set to balance the bridge at a predetermined temperature and heat dissipation level of the temperature-sensitive resistance when immersed in the medium whose heat dissipation capacity is to be monitored. The circuit further includes means, responsive to a bridge imbalance resulting from a change in heat dissipation capacity of the medium, for varying current flow to the bridge to return the temperature-sensitive resistance to the predetermined temperature and heat dissipation level and re-balance the bridge at a different voltage level. The difference in voltage between the first bridge balance level and the second bridge balance level represents the medium heat dissipation adjustment required to maintain the temperature-sensitive resistance at the predetermined temperature and heat dissipation level.

In one embodiment, the means for varying includes means for selectively gating current from a voltage source to the bridge. The circuit further includes means, responsive to the difference in voltage between the first bridge balance level and the second bridge balance level, for determining the heat dissipation adjustment required to maintain the temperature-sensitive resistance at the predetermined temperature and heat dissipation level. The bridge circuit may be balanced at a temperature higher than that of the medium and the temperature-sensitive resistance may be a thermistor.

This invention further features a system for maintaining a cooling medium at a constant heat dissipation capacity. There are means for defining the initial heat dissipation capacity of the medium at a predetermined temperature of a temperature-sensitive element immersed in the medium, temperature correction means for sensing a change in temperature of the element and for restoring the temperature of the element to the predetermined temperature, and adjustment determination means for defining the adjustment in heat dissipation capacity required to restore the initial heat dissipation capacity of the medium. The system further includes means, responsive to the adjustment determination means, for modifying the heat dissipation capacity of the medium by the required adjustment to return the medium to the initial heat dissipation capacity.

In one embodiment, means for defining imparts a first level of power to the temperature-sensitive element, the temperature correction means alters the level of power until the predetermined temperature is achieved at a second level of energy, and the adjustment determination means establishes the required adjustment in heat dissipation capacity as a function of the difference between the first and second levels of energy. The adjustment determination means may include means for comparing the levels of power to a reference level and means for adjusting the reference level. The means for modifying includes fluid mover means for altering the flow of the fluid.

In another embodiment, the means for modifying includes means for adjusting the temperature of the fluid. The system further includes cooling failure indicating means for detecting deviations in heat dissipation capacity exceeding a predetermined amount.

DISCLOSURE OF PREFERRED EMBODIMENT

Other objects, features and advantages will occur from the following description of a preferred embodiment and the accompanying drawings, in which.

Figure 1:
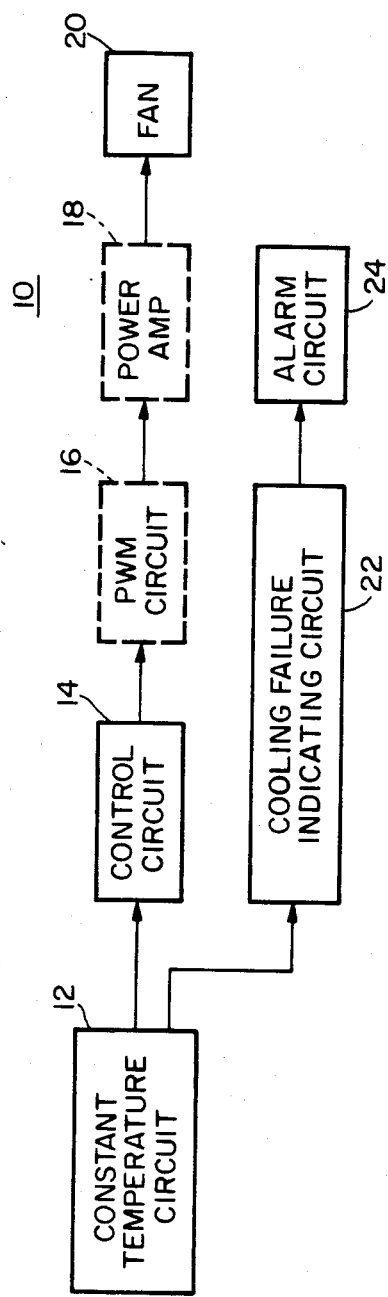
FIG. 1 is a schematic block diagram of a constant cooling system according to this invention.

This invention may be accomplished by a constant cooling circuit which maintains a temperature-sensitive element, immersed in a cooling medium, at a predetermined element temperature and quantifies the heat dissipated by the cooling medium from the element. A constant level of power is supplied to the element by the circuit as long as the heat dissipation capacity of the cooling medium remains constant. A change in heat dissipation capacity of the cooling medium causes a change in temperature of the element, and the circuit compensates for the change in element temperature by varying the power supplied to the element to return the element to the predetermined element temperature. The variation in power represents the adjustment required in the heat dissipation capacity of the medium to return it to its initial capacity.

A constant cooling system according to this invention includes such a constant cooling circuit and responds to the variation in power within its constant cooling circuit by modifying the cooling medium to return the heat dissipation capacity of the medium to the initial, desired level. The system senses that the original heat dissipation capacity of the cooling medium is restored when the original level of power establishes the element at the predetermined element temperature. At this point no further modification of the cooling medium is required.

Constant cooling system 10 according to this invention includes a constant temperature circuit 12 according to this invention which monitors the cooling level being applied to a temperature-sensitive resistance such as a thermistor by means of airflow generated by a fan. A control circuit 14, responsive to constant temperature circuit 12, increases electrical output to fan 20 when the thermistor cooling is insufficient and decreases the output to the fan when the level of thermistor cooling is more than necessary. The output from control circuit 14 in one construction is converted to a pulse width modulated signal in circuit 16 which drives a power amplifier 18, both shown in phantom, which in turn drives fan 20. Alternatively, fan 20 is directly driven by control circuit 14. If the output from constant temperature circuit 12 indicates that the heat dissipation capacity of the air has fallen below a critical level, a cooling failure indicating circuit 22 senses that condition and provides an output to an LED or other alarm in alarm circuit 24 or forwards an alarm signal to processing logic.

Figure 2:
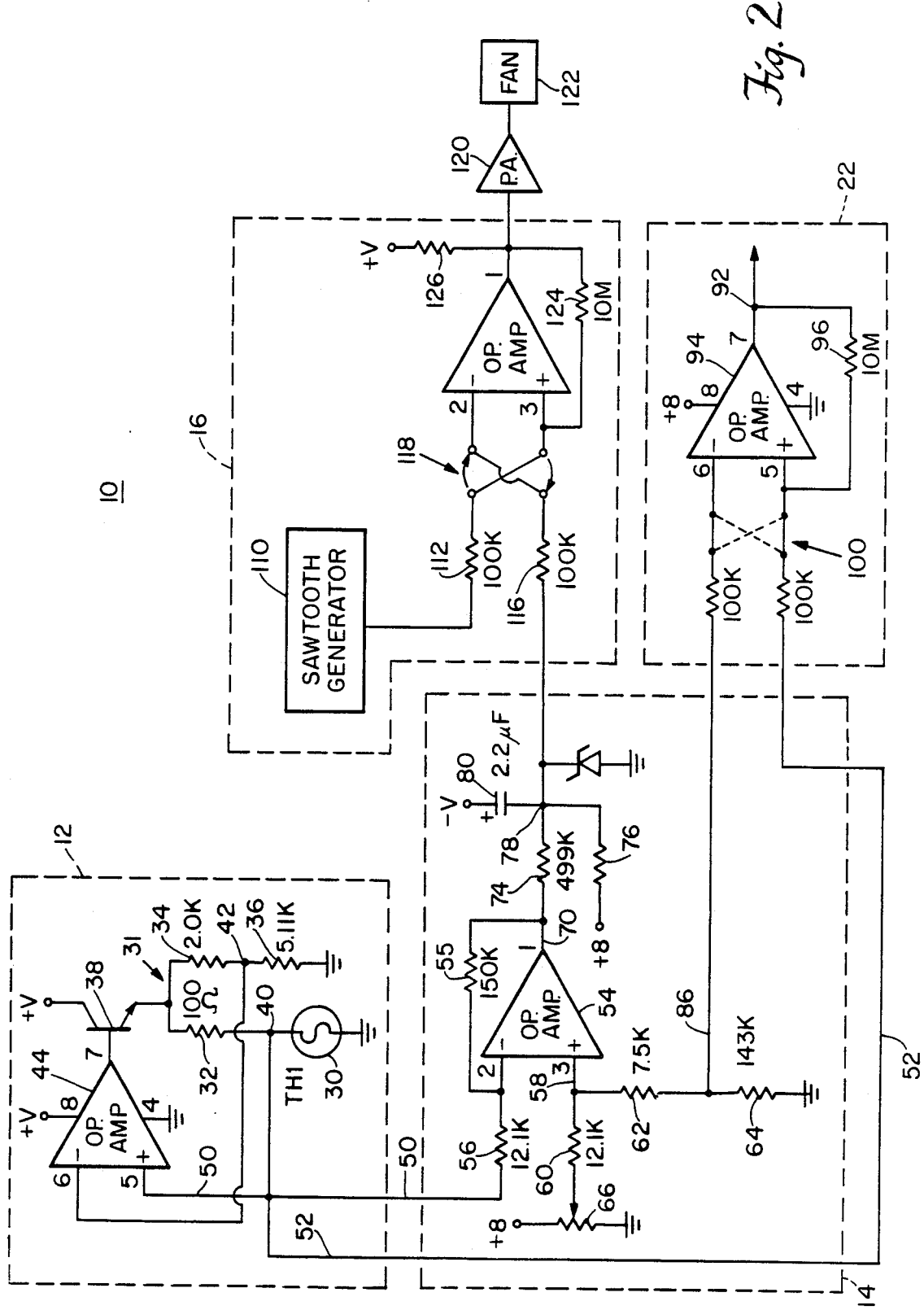
FIG. 2 is a circuit diagram of the system of FIG. 1.

Constant temperature circuit 12 according to this invention, FIG. 2, includes thermistor 30 which is positioned in the airflow to be monitored. Thermistor 30 is a part of bridge circuit 31 which also includes resistors 32, 34 and 36. In one embodiment thermistor 30 may be designed to have a 255 ohm resistance at 150° C. Resistance values of resistors 32, 34, 36 set the operating temperature of thermistor 30. Transistor 38, with its collector connected to positive supply +V, provides sufficient current flow through the bridge resistors and the thermistor to maintain the center points 40, 42 in balance.

Bridge circuit 31 defines the heat dissipation capacity of the medium at the operating temperature of thermistor 30. A change in heat dissipation capacity of the medium changes the temperature of thermistor 30 and therefore changes its resistance; the change in resistance alters the voltage level at point 40. When point 40 begins to move away from point 42 because the cooling of thermistor 30 has increased or decreased, operational amplifier 44 provides an output signal which modifies the base current and therefore the emitter current through transistor 38. That is, if the convective cooling is too great on thermistor 30, then the voltage at point 40 begins to rise above point 42, in which case the input on pin 5 rises higher than the input on pin 6. That causes the current out of pin 7 of operational amplifier 44 to increase and thus increase the current flow through transistor 38, which in turn increases the $i^2r$ power drop in the thermistor 30. The increase in current flow through thermistor 30 increases its temperature which decreases its resistance. A second bridge balance level is reached at the higher level of current flow which is measured at point 40, now in balance with point 42, as a higher voltage level. The difference in voltage defines the adjustment in heat dissipation capacity of the medium required to return the medium to the initial heat dissipation capacity.

Constant temperature circuit 12 strives to keep points 40 and 42 constantly in balance which in turn maintains thermistor 30 at a constant temperature. Thermistor 30 is thereby maintained at a constant heat dissipation level because it continually radiates a constant amount of heat rather than overheat or underheat as the heat dissipation capacity of the fluid varies. Voltage across thermistor 30 is delivered on line 50 to control circuit 14 and on line 52 to cooling failure indicating circuit 22.

Control circuit 14 includes operational amplifier 54 which receives one input on line 50 through resistor 56 and a second input on line 58 through a voltage divider including resistors 60, 62 and 64 and potentiometer 66. These four resistors are used to set the reference level voltage against which the voltage on line 50 is compared. An increase in the voltage on line 50 with respect to the reference level on line 58 indicates that there is too much cooling and that the fan speed must be decreased. The output of operational amplifier 54 on line 70 then decreases. This signal can be used directly to control the fan if the fan control is an analog device or can be fed into the pulse width modulating circuit 16 if a digital control is anticipated.

Operational amplifier 54 may be operated as a proportional amplifier without the use of a feedback resistor 55 or as an integral amplifier if a capacitor is used in place of resistor 55. A blend of the two may be accomplished by using both a parallel resistor and capacitor feedback path.

In most situations, even if the cooling required drops to zero so that the fan can be totally shut off, it may be desirable to keep the fan running at some idling level. To do this a clamping circuit can be used including resistor 74 and resistor 76. The combination of those two resistors clamps point 78 at a minimum level so that even if the cooling requirements go below that level the fan is still be kept on at some idle speed. Capacitor 80 may be included in order to insure that upon the energization of the circuit the fan begins operation at high speed and then slowly decreases speed through the operation of the RC network of capacitor 80 and resistor 74.

When the system cannot meet preselected cooling requirements, the voltage on line 52 drops below a threshold value which is provided on line 86; line 86 is a reference level derived from the voltage divider resistors 60, 62 and 64. Line 86 has a voltage lower than the cooling reference signal on line 52; resistors 62, 64 determine the fault indication curve, described below, for circuit 22. Thus when the voltage on line 52 drops below the reference voltage on line 86 a fault signal is generated at the output 92 of operational amplifier 94. A positive feedback device such as resistor 96 is used to provide positive and quick switching and avoid dithering in the output signal. When the circuit is connected as shown, the fault output is positive. Cooling failure indicating circuit 22 therefore provides a positive and unambiguous switching signal.

A switch can be provided as shown in 100 so that when connected directly through, indicated in full lines, the output of operational amplifier 94 is normally open and, upon occurrence of a fault, closes. If switch 100 is connected as shown in phantom, the output of operational amplifier 94 is normally closed but opens upon occurrence of a fault.

Pulse width modulator circuit 16 includes a sawtooth generator or ramp circuit 110 which provides, through resistor 112, one input to operational amplifier 114 which preferably operates outside of the audible range, e.g., approximately below 100 Hz or over 20,000 Hz, but any desirable frequency can be chosen. The other input to operational amplifier 114 through resistor 116, whose resistance matches resistor 112, comes directly from the output of control circuit 14. A pulse is generated each time the sawtooth peak passes through the voltage level provided at the output of control circuit 14. With switch 118 in the position as shown the pulse width generated in this fashion represents the off-time of the associated fan. With the switch in the opposite position the generated pulse represents the on-time of the associated fan. The output of operational amplifier 114 is fed through a power amplifier 120 to the associated fan 122. Operational amplifier 114 also includes a positive feedback resistor 124 and a pull-up resistor 126 may also be provided. Power amplifier 120 is not necessary as fan 122 may have its own logic power control.

In operation, constant temperature circuit 12 maintains thermistor 30 at a constant heated temperature, e.g. 150° C. The temperature of thermistor 30 remains constant until the heat dissipation capacity of the fluid surrounding thermistor 30 changes. The heat dissipated by the thermistor is utilized as a measure of cooling effectiveness of the medium, where changes in current applied to bridge circuit 31 and resulting changes in voltage across thermistor 30 represent the heat dissipation adjustment required to maintain thermistor 30 at 150° C. In other words, less current is required to maintain thermistor 30 at 150° C. if the temperature of the fluid increases without a simultaneous increase in its flow. Similarly, if the flow is reduced while fluid temperature remains constant, constant temperature circuit 12 must decrease current supplied to thermistor 30 to maintain it at the desired temperature because less heat is dissipated by the fluid.

The heat dissipated by thermistor 30 serves as a model for heat dissipated by equipment monitored by constant cooling system 10. Because the equipment typically generates a constant level of heat, an increase in the fluid temperature or a decrease in flow results in a rise in equipment temperature. Lower cooling effectiveness of the fluid corresponds to a lower dissipation from thermistor 30; constant cooling system 10 then modifies the heat dissipation capacity of the fluid to accomplish a heat dissipation adjustment before the equipment temperature rises significantly.

Figure 3:
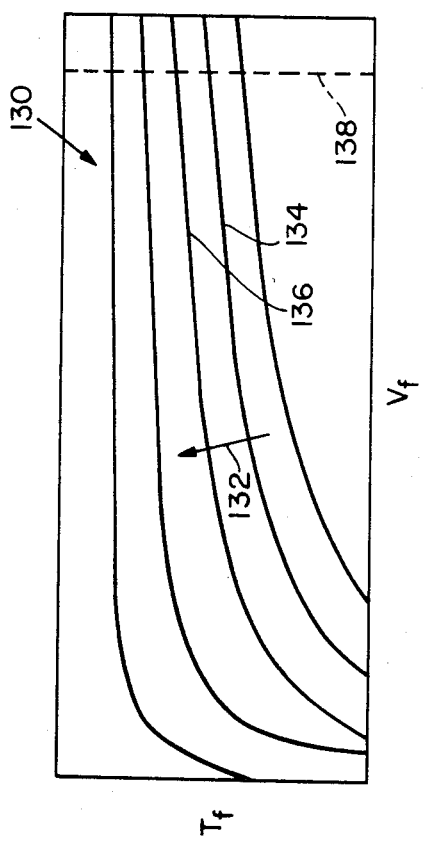
FIG. 3 is a chart of constant cooling curves, defined by the flow of a fluid and its corresponding temperature, which are utilized by the cooling controller of FIG. 2.

For a space of fixed volume to be cooled, the relationship of cooling effectiveness to fluid velocity $V_F$ and fluid temperature $T_F$ is shown in FIG. 3. Curves 130 represent constant cooling lines, that is, constant heat dissipation curves. Successively higher curves, progressing in the direction indicated by arrow 132, represent lower heat dissipation capacity of the fluid. It is desirable for constant cooling system 10 to maintain the temperature and velocity relationship exhibited by a single curve such as curve 134. Bridge circuit 31 of constant cooling system 10 remains in balance as long as a change in one variable is matched by a change in the other variable such that the relationship of curve 134 is maintained.

Dashed line 138 indicates the maximum fan speed and the resulting maximum fluid velocity which constant cooling system 10 can accomplish. Cooling failure indicating circuit 22 can be set such that a decrease in heat dissipation capacity of the fluid beyond fault curve 136 trips an alarm. System operation below and to the right of curve 134 is acceptable since that region of curves signifies greater cooling.

An important feature of this invention, however, is that demands are placed on the fan, or other device for modifying heat dissipation capacity of the fluid, only to the extent that modification of the heat dissipation capacity is required. For example, cooling fan 122 is commanded by constant cooling system 10 to operate at a quiet idle speed until greater fluid flow velocity is required.

Figure 4:
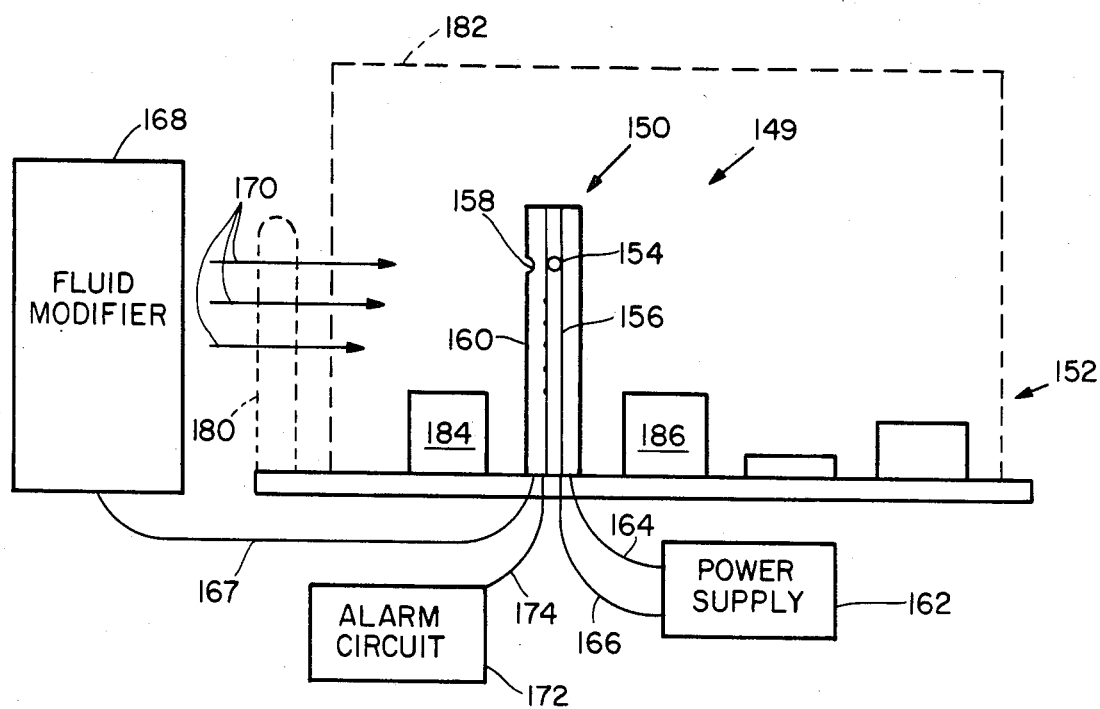
FIG. 4 is a schematic cross-sectional view of a constant cooling system according to this invention mounted in equipment whose heat dissipation is to be monitored.

Constant cooling system 149, FIG. 4, includes constant cooling unit 150 mounted among electrical equipment 152. Thermistor bead 154 is mounted on circuit board 156 and faces opening 158 in housing 160. U.S. Pat. No. 4,476,720 is incorporated herein by reference, especially for its teachings of housing 160.

Constant cooling unit 150 is powered by power supply 162 through power input line 164 and ground line 166. Constant cooling unit 150 through line 167 commands fluid modifier 168, which in turn controls fluid flow indicated by arrows 170. When fluid flow modifier 168 includes a fan, its speed is controlled by constant cooling unit 150 to maintain the heat dissipation capacity of the fluid at a relatively uniform level. In other constructions, fluid modifier 168 includes refrigeration elements for variably cooling the fluid as commanded by constant cooling unit 150. Other parameters affecting heat dissipation capacity can also be modified, such as by changing the humidity of the fluid when it is a gas. Alarm circuit 172 is activated through line 174 when the heat dissipation capacity of the fluid can no longer be effectively controlled.

When a constant cooling unit according to this invention, e.g. unit 180, is mounted at the inlet of housing 182, indicated in phantom, unit 180 responds to internal aerodynamic characteristics of equipment 152 as well as the ambient temperature of the fluid. When positioned within housing 182 and among components 184, 186, such as the location of unit 150, additionally responds to the quantity of heat generated by equipment 152. In either position, however, a constant cooling system according to this invention senses changes in heat dissipation capacity of the fluid and modifies the fluid to compensate for that change. The heat dissipation capacity of the medium is maintained at a constant level.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A circuit for monitoring the heat dissipation capacity of a cooling medium, comprising:
    means for defining the initial heat dissipation capacity of the cooling medium by imparting a first level of power to a temperature-senstive element immersed in the cooling medium to maintain the temperature of said element at a predetermined temperature;
    means for sensing a change in temperature of said element; and
    means, responsive to said means for sensing, for restoring the temperature of said element to said predetermined temperature by altering the power imparted to said element until said predetermined temperature is achieved at a second level of power.

2. The circuit of claim 1 further including means, responsive to said means for restoring, for indicating the differential in power, required to return the element to said predetermined temperature, representative of the corresponding change in the heat dissipation capacity of the medium.

3. The circuit of claim 2 in which said means for defining includes a bridge circuit having said temperature-sensitive element in one leg of said bridge circuit.

4. The circuit of claim 3 in which said bridge circuit is balanced by the resistance of said element at said predetermined temperature.

5. The circuit of claim 4 in which said means for restoring the temperature of said element includes means, responsive to a bridge imbalance, for varying current flow to said bridge circuit to return said temperature-sensitive element to said predetermined temperature and rebalance the bridge at a different voltage level.

6. The circuit of claim 5 in which said means for indicating represents the change in heat dissipation capacity as the difference in voltage between the first and second bridge balance levels.

7. The circuit of claim 1 in which said temperature-sensitive element is a thermistor.

8. A circuit for monitoring the heat dissipation capacity of a cooling medium, comprising:
   a bridge circuit;
   one leg of said bridge circuit including a temperature-sensitive resistance set to balance the bridge at a predetermined temperature and heat dissipation level of said temperature-sensitive resistance when immersed in the medium whose heat dissipation capacity is to be monitored; and
   means, responsive to a bridge imbalance resulting from a change in heat dissipation capacity of the medium, for varying current flow to said bridge to return said temperature-sensitive resistance to said predetermined temperature and heat dissipation level and re-balance the bridge at a different voltage level, the difference in voltage between the first bridge balance level and the second bridge balance level representing the cooling medium heat dissipation adjustment required to maintain said temperature-sensitive resistance at said predetermined temperature and heat dissipation level.

9. The circuit of claim 8 in which said means for varying includes means for selectively gating current from a voltage source to said bridge.

10. The circuit of claim 8 further including means, responsive to the difference in voltage between the first bridge balance level and the second bridge balance level, for determining the heat dissipation adjustment required to maintain said temperature-sensitive resistance at said predetermined temperature and heat dissipation level.

11. The circuit of claim 8 in which said temperature-sensitive resistance is a thermistor.

12. The circuit of claim 8 in which said bridge circuit is balanced at a temperature higher than that of the medium.

13. A system for maintaining a cooling medium at a constant heat dissipation capacity, comprising:
   means for defining the initial heat dissipation capacity of the cooling medium by imparting a first level of power to a temperature-sensitive element immered in the cooling medium to maintain the temperature of said element at a predetermined temperature;
   means for sensing a change in temperature of said element;
   means, responsive to said means for sensing, for restoring the temperature of said element to said predetermined temperature by altering the power imparted to said element until said predetermined temperature is achieved at a second level of power;
   means, responsive to said means for restoring, for indicating the differential in power, required to return the element to said predetermined temperature, representative of the corresponding change in the heat dissipation capacity of the medium; and
   means, responsive to said means for indicating, for modifying the heat dissipation capacity of the medium return the medium to said initial heat dissipation capacity.

14. The system of claim 13 in which said means for indicating includes means for comparing the levels of power to a reference level.

15. The system of claim 14 in which said means for comparing includes means for adjusting said reference level.

16. The system of claim 13 in which said means for modifying includes medium mover means for altering the flow of the medium.

17. The system of claim 13 in which said means for modifying includes means for adjusting the temperature of the medium.

18. The system of claim 13 further including cooling failure indicating means for detecting deviations in heat dissipation capacity exceeding a predetermined amount.

* * * * *